April 13, 1971  H. D. STROMBERG ET AL  3,574,580
PROCESS FOR PRODUCING SINTERED DIAMOND COMPACT AND PRODUCTS
Filed Nov. 8, 1968

INVENTOR.
HAROLD D. STROMBERG
DOUGLAS R. STEPHENS
BY
Roland A. Anderson
ATTORNEY United States Patent Office 3,574,580
Patented Apr. 13, 1971

3,574,580
PROCESS FOR PRODUCING SINTERED DIAMOND COMPACT AND PRODUCTS
Harold D. Stromberg, Oakland, and Douglas R. Stephens, Castro Valley, Calif., assignors to the United States of America as represented by the United States Atomic Energy Commission
Filed Nov. 8, 1968, Ser. No. 774,274
Int. Cl. B24d 3/02
U.S. Cl. 51—307
7 Claims

ABSTRACT OF THE DISCLOSURE

Process including preliminary cleansing and essential preconditioning treatment of finely divided diamond particles followed by compaction of the preconditioned particles at high temperatures and pressures in the diamond stable region to produce dense self-bonded sintered diamond compact. Incorporation of boron, silicon or beryllium as sintering aid agents with the preconditioned particles still further promotes sintering and bonding of the compact.

BACKGROUND OF THE INVENTION

Figure 2:
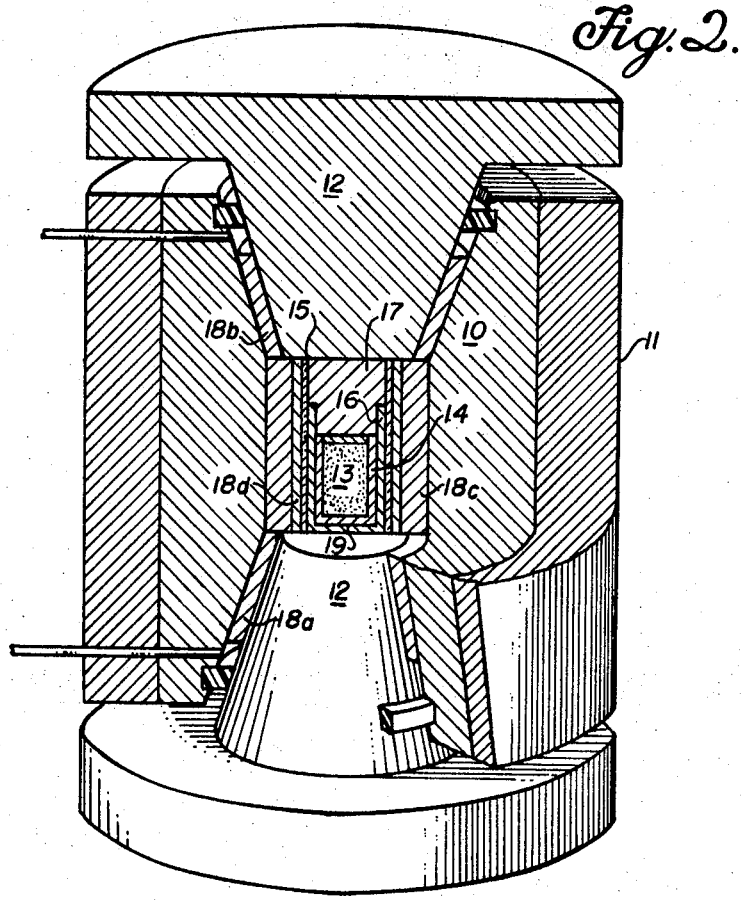

This invention was made in the course of, or under, Contract W-7405-ENG-48 with the United States Atomic Energy Commission.

FIELD OF THE INVENTION

The invention pertains generally to the production of diamond compacts and, more particularly, to an essentially self-bonded diamond particle compact material and method of production.

Natural diamonds in the form of single crystals (stones) and polycrystalline aggregates have been used in cutting and drilling tools, wire dies, indenters, tools for shaping and dressing conventional abrasive wheels, for working super hard materials and for many other purposes. Due to the scarcity and cost of naturally occurring larger size diamond stones or aggregate bodies considerable effort has been expended in attempting to bond more inexpensive and plentiful small size diamond particles into bodies or compacts having properties approximating those of large size diamond or polycrystalline-diamond aggregates.

As summarized in U.S. Pat. No. 3,306,720, issued Feb. 28, 1967, the bonding together of diamond particles has, in the past, been proposed by two general mechanisms or a combination thereof; viz, securing direct diamond-to-diamond cohesion or employing a non-diamond bonding agent to provide a link between adjacent diamond particles. A procedure more fully disclosed in U.S. Pat. 3,141,746, issued on July 21, 1964, utilizes certain metals, in a high pressure, high temperature compact molding procedure, to promote diamond-to-diamond bonding. It is stated, in the first mentioned patent, that the direct diamond-to-diamond bonding procedure results in detrimental crushing of the diamond particles. When bonding agents are employed in producing diamond particle compacts, the compacts have highly modified properties which reflect the presence of non-diamond materials in the compact or matrix. Diamond compact materials prepared by these and other prior art procedures have utility for many industrial uses; however, there still exists a long felt need for a procedure for preparing diamond compacts in which diamond-to-diamond bonding is at a maximum, breakage of diamond particles is minimized, and bonding is effected with a minimum or preferably a total absence of an extraneous bonding agent, so as to more nearly approximate the properties of single diamond crystals or polycrystalline diamond aggregates.

SUMMARY OF THE INVENTION

In brief, in the process of our invention, finely-divided diamond particles, i.e., powder or dust, of selected particle size, is subjected to a preliminary cleansing operation utilizing solvents to remove gross impurities. The cleaned diamond dust is then preconditioned by heating to an elevated temperature, below the diamond-to-graphite transition temperature, in a high vacuum. To avoid recontamination or deconditioning the diamond dust is subsequently stored and manipulated in an inert gas atmosphere. Preconditioned diamond dust may then be compacted at high pressures and at elevated temperatures generally in the diamond stable region of the graphite-diamond phase system. The preconditioning operation has been found especially essential for obtaining diamond-to-diamond adhesion in the subsequent compacting operation. It has also been found that, with small amounts of elemental boron silicon or beryllium powder intermixed with the preconditioned diamond dust, a higher ratio of successful compacts is formed than without such additives. The product is a dense coherent self-bonded diamond particle compact having a density approaching the density of diamond crystal and having a hardness approximating that of diamond crystal. However, the diamond compact is much tougher and resistant to cleavage than is diamond crystal due to the random orientation of the diamond particles. Also, fracturing of the particles is eliminated by utilizing diamond dust of small particle size and the physical properties of the compact are substantially isotropic as compared to the significantly anisotropic properties of diamond crystal.

Accordingly, it is an object of the invention to provide for the consolidation of diamond particle dust to form a diamond compact or self-bonded diamond particle aggregate solid.

Another object of the invention is to provide a process for forming and bonding finely-divided diamond particles or dust to form a compact in which a direct diamond-to-diamond bond is obtained and the compact has a hardness approximating that of solid diamond.

Figure 1:
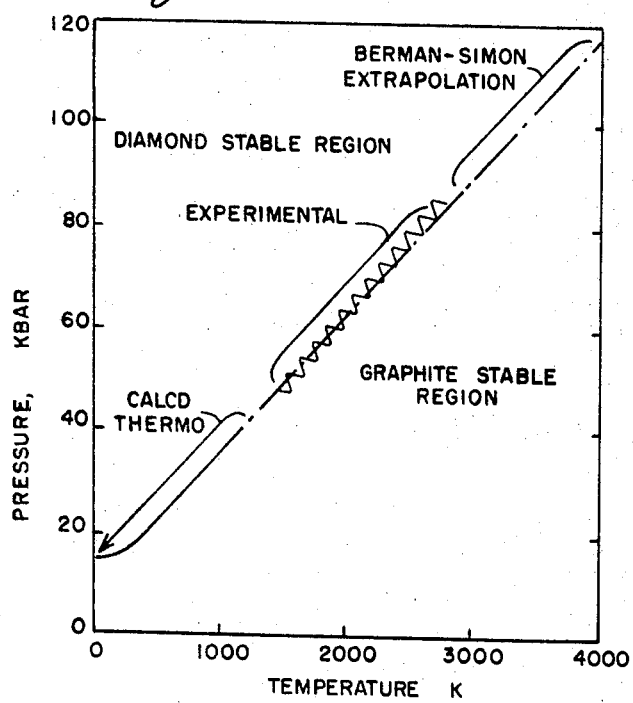

Other objects and features of the invention will be apparent in the following description and accompanying drawing of which:

FIG. 1 is a diamond-graphite phase diagram disclosed by Bundy et al., Journal of Chemical Physics 35, 383 (1961) and reproduced at page 295, vol. IV (1964) of "The Encyclopedia of Chemical Technology" published by the Interscience Publishing Co., wherein the solid and broken line portions comprise the diamond-graphite equilibrium line derived as indicated and wherein the wavy line portion indicates experimentally derived values; and FIG. 2 is a cross-sectional view of a portion of an apparatus for use in operating the process of the invention.

DETAILED DESCRIPTION

In operating the process of the invention finely-divided diamond particles or diamond dust of whatever source, natural or synthetic, may be used. Natural diamond dust is recovered in mining operations and large quantities are produced in diamond crushing, diamond cutting and diamond polishing operations used in producing diamond abrasive products and jewelry items. The product in the latter instance is known in the trade as "swarf." Inevitably, in such operations, diamond dust in particle sizes below 50 microns in size are produced in amounts which far exceed the demand or which cannot otherwise be employed in useful operations. Likewise, in the prior art the synthesis of diamond, e.g., by catalyzed conversions from graphite and the like at high temperatures and pressures or by explosive methods, a significant amount of smaller micron and submicron particle size diamond is produced.

Diamond dust in particle sizes of at least as small as about 0.3 to as large as about 60 microns in diameter may be employed in operating the process of the invention. Particle sizes in the range of about 0.5 to about 10 microns are preferred and particle sizes in the range of 0.5 to about 5 microns are especially preferred since it has been noted that diamond dust with particle sizes in the few micron to submicron range yield a more homogeneous compact and compacts which have the greatest strength and greatest measurable hardness approaching or approximating that of solid diamond crystal. With particle sizes in the range of, for example, 20 to 40 microns or 40 to 60 microns, a less homogeneous compact is usually obtained, and, although regions of effective direct diamond-to-diamond bonding and sintering are noted, the compacts yield a lower measurable hardness indicating a lower strength compact.

Admixtures of smaller size, e.g., 0.3 micron to 10 micron diamond dust particles with larger size particles, e.g., 30 to 60 microns, in amounts sufficient to fill the interstices therebetween, should also provide high strength, high hardness compacts. Mixtures including at least about 20 parts by weight of the smaller size dust may be used. It is considered that with the smaller micron size diamond dust, e.g., 0.5 to 10 microns, being present the diamond dust may tend to behave somewhat as a plastic mass or quasi-hydraulically to equalize pressures, avoid particle fracturing and obtain the maximum initial contact between particle surfaces. Likewise, when sufficient small size dust is included with larger size dust or even larger grain size diamonds in amounts filling the interstices therebetween, a similar effect to reduce breakage of the larger particles will be obtained. It will be observed that the starting materials are of low cost and the final product, being a larger solid diamond body, is of much greater value indicating the very favorable economic aspects of the present procedure. With any of the foregoing admixtures, direct diamond-to-diamond bonding and sintering is obtained. The effectiveness of the bonding is indicated in that with the harder material tested as with a Vickers hardness testing device, the diamond indenter point fractures after only a few hardness tests. Hardness measured by the foregoing Vickers device may range above 8000 to 9000 HV (hardness Vickers) wherein single diamond crystal is taken at 10,000 HV with certain orientations.

Diamond particles material or dust to be compacted, in accordance with the invention, is washed successively in solvents to remove gross contamination such as oils and hydrocarbons remaining from previous processing, reclaiming operations or the like. The washing may be done by mixing with a solvent such as low-boiling ketones, e.g., acetone, chlorinated hydrocarbon or a degreasing agent, e.g., trichloroethylene or dichloroethane and separating the solvent by decantation or filtration, repetitively, one or more times. It is generally preferred to complete the washing operation using a high purity volatile solvent such as methyl or ethyl alcohol so that on drying no residue is left on the surface of the diamond particles.

Cleaned diamond particles or dust such as that provided above is subjected to preconditioning by heating to an elevated temperature below the diamond-to-graphite transition temperature. Typically clean diamond dust is placed in a closed chamber adapted for heating and evacuation. The material in the chamber is heated to the approximate range of 300° to 1000° C. while vacuum pressure of below about $10^{-5}$ and preferably below about $10^{-6}$ torr is applied and even more preferably until a vacuum pressure of at least as low as $10^{-7}$ torr is attained. For most operations heating to a temperature in the range of about 400° to 600° C. is found satisfactory while temperatures of the order of 500° C. are preferred for convenience. Times of the order of 0.5 hour and above will generally be required. This preconditioning treatment of the finely-divided diamond has been found to be indispensable and essential to obtain diamond-to-diamond cohesion and sintering in the subsequent compacting operation. It is considered that the preconditioning treatment effectively removes all adsorbed contaminant gases such as air constituents as well as tightly adsorbed materials such as hydrocarbons, waxes, fats, cutting agent media, and other materials with which the diamond dust may have come into contact with and which noramlly interfere with the establishment of a direct diamond-to-diamond bond.

Once evolution of gaseous material from the chamber slows or ceases so that the indicated high vacuum is attained an inert gas, e.g., a clean noble gas such as helium, neon or argon is introduced into the chamber and the chamber is cooled to ambient temperature. The preconditioned material is then removed from the chamber and stored preferably in a clean, dry atmosphere of said inert gas, to avoid recontamination. It is quite possible that preconditioning of the diamond particle surface would also facilitate bonding of the diamond particles by other procedures such as those in which refractory metals, carbide and the like are employed as bonding agents.

In any event, for producing a diamond compact from the preconditioned diamond particles or dust in accordance with the present invention, an assemblage of an appropriate particle size or mixture of particle sizes of the diamond particles is disposed in a suitable mold container, and the assemblage is compressed at appropriate pressures and temperatures as set forth hereinafter.

The mold filling operation is preferably conducted in a clean dry inert gas atmosphere to prevent contamination of the diamond surfaces. It is, of course, essential that the preconditioned particles are in substantially direct contact over at least a portion of the surfaces during subsequent compression and heating. The selection of particle size and/or mixing may be done either before or after the preconditioning treatment. While a significant and useful degree of bonding is achieved using preconditioned material alone it has been found that powdered elemental boron, silicon or beryllium added and intermixed in amounts of below about 2 to 3% by weight to usually employed amounts of about 1% by weight with the preconditioned diamond dust promotes formation of strong compacts to a remarkable degree while, as noted above, direct particle contact is considered necessary for achievement of the bond; the quantities of boron added herein does not interfere. Amounts of below about 1% to at least as low as 0.2% by weight of the promoter agent generally suffice for effective promotion of bonding. The elemental metallic bonding promoter agent should be in a finely-divided state and preferably of a few micron to submicron particle size, e.g., 0.5 to one micron intimately intermixed with the diamond dust. The manner in which the boron, silicon or beryllium acts to promote bonding and sintering is not completely understood. Several effects may be possible. The boron, silicon or beryllium may activate the diamond surface by removing or preventing contamination with oxygen, nitrogen or other impurities or perhaps by reaction with any small amount of graphite formed during the sintering operation to produce carbides of exceptional strength. Also boron and perhaps the other agents may diffuse into the diamond surface to provide an interface which facilitates bonding. In addition, the indicated materials might combine with any small amount of graphite formed during compaction which might interfere with formation of the direct diamond-to-diamond bond and thereby eliminate the detrimental effect of any graphite remaining in the diamond particles or formed during the compaction operation.

It will be appreciated that diamond dust of a selected particle size range such as 0.5 to 5 microns, 1 to 10 microns, 30 to 40 microns, or others in the range of submicron to about 50 micron size as well as selected mixtures of particle sizes or layered arrangements with or without the boron, beryllium or silicon bonding promoter may be provided in the mold container dependent on the properties or configuration desired. It is preferred that the container be evacuated and sealed or other provision be made to evacuate the container during compaction.

High pressure, high temperature compression or compaction apparatus, of conventional design, such as the so-called "belt" or "girdle" apparatus and others employed in synthetic diamond manufacture may be employed for compaction of the preconditioned diamond material provided as described above. Typical of such an apparatus is the girdle apparatus described in U.S. Pat. No. 2,938,998 to Wilson entitled "High Pressure Dies," as well as those described on page 298 of "The Encyclopedia of Chemical Technology," Vol. IV, 1964, published by Interscience Publishing Company. FIG. 1 shows a cross-sectional view of the basic elements of such an apparatus wherein preconditioned diamond dust charge 13, which may include powdered boron, as set forth above, is disposed in mold container 14. Container 14 may be a can of tantalum or other inert refractory metal of desired configuration. The diamond dust mixture could also be disposed in the container before preconditioning. The container 14 is filled and stored in an inert gas atmosphere such as argon to prevent contamination. Prior to molding the container is evacuated to below about $10^{-5}$ torr and preferably below $10^{-7}$ torr and is closed and sealed as by electron beam welding in a vacuum to exclude all gas from the container. To provide for heating with electrical current a tubular graphitic carbon furnace enclosure 15 encompasses container 14 and is insulated therefrom by the boron nitride sleeve 16 and pyrophyllite enclosure 17. A centrally inward tapering annular tungsten carbide compression member 10 is disposed circumjacent sleeve 15 with annular pyrophyllite gaskets 18c, 18d interposed to transfer lateral pressures thereto. Member 10 is surrounded by annular high strength steel binding rings 11 to take up the lateral forces generated during compaction. Tapered tungsten carbide pistons or rams 12 and 12' which may also be encompassed by high strength steel binding rings project from opposite sides into the central opening of annular member 10 sealed and insulated from the tapering portions of member 10 by frusto-conical pyrophyllite gaskets 18a, 18b. With this arrangement, effective compaction pressure is transferred and applied to diamond powder 13. Annular pyrophyllite gaskets 18a, b, c, d, electrically insulate the tapered pistons 12, 12', as well as the carbon furnace sleeve 15 from member 10. However, the ends of sleeve 15 are in contact with piston 12 and 12' whereby electrical heating current from a source, not shown, may be passed therethrough. The temperature of the container 14 is controlled by regulating the power supplied to furnace sleeve 15. To provide for evacuation compliant gaskets (not shown) may be disposed between cooler portions of ram 12, 12' and member 10 beyond pyrophyllite member 18a 18b, and with conduit 21, 21' communicating with vacuum pumps (not shown).

It has been found advantageous to thus enclose the entire apparatus in a vacuum environment of below about $10^{-4}$ torr to prevent air from penetrating into container 14 through imperfect welds, ruptures or the like.

Compaction is accomplished by placing the girdle apparatus in suitable press. For accurate pressure control the force exerted by the press is calibrated by techniques well known in the art against materials which exhibit readily discernible electrical transitions at different pressures. For example, at room temperature bismuth undergoes distinct conductivity changes at 25.4 and 80 kb. (kilobars) and ytterbium at 39 kb. and barium at 58 kb. These are used in the container with the resistivity monitored between the rams to obtain a graph of the effective pressure prevailing in the compression chamber in response to the total pressure exerted by the press.

A problem arises in using the conventional girdle apparatus described above in that the pressure gradients imposed on the diamond particles in container 14 may not be completely uniform. Detrimental effects in this circumstance can be minimized by slow progressive depressurization of the container 14. Preferably, the temperature is raised above 1600° C. to as high as at least 2000° C., with temperatures of 1800 to 1900° C. being adequate to provide rapid and effective compaction and bonding in time periods as short as 15 minutes. With the higher temperatures, the pressure is correlatively increased to maintain, preferably, diamond stable conditions in the container. Typically, pressures of the order of 55 to 80 kilobars with the foregoing temperatures above 1600° C. for time periods of the order of up to one hour are quite adequate. Longer time periods of up to eight hours duration were not found to improve results significantly. While it is considered preferable to operate in the diamond stable region as indicated above, it has been quite unexpectedly found that effective compaction and bonding of the diamond without significant transition of diamond to graphite are also achieved under conditions on the borderline or even somewhat within the graphite stable region provided that compaction time is limited to below about two hours. After compaction and sintering or bonding, as described, the temperature is lowered to a point safely below the diamond-to-graphite transition temperature in FIG. 2 and then the compaction pressure is slowly lowered. After a temperature safely below the transition point is attained both the temperature and pressure may be returned to ambient so that the sintered diamond compact may be removed. The shape of the compact is of course primarily determined by the shape of container 14 which forms a die for the diamond powder. Tools, inserts, etc. may therefore be fashioned directly in the die.

Further details of the process of the invention will be set forth in the following specific examples:

Examples

Diamond dust of size ranges set forth in the table below were washed successively with acetone and finally with alcohol and then dried. The clean diamond dust was then preconditioned by heating to 500° C. in a vacuum chamber until degassing ceased and a vacuum pressure of $10^{-7}$ torr was achieved. Clean dry argon was let into the chamber and the diamond dust was cooled and stored under an argon atmosphere. The preconditioned diamond dust material alone or in admixture with weight percentages of micron sized boron, silicon or beryllium dust specified in the table were loaded into a container in the form of a 3/16 inch length of 3/16 inch diameter 10 mil wall thickness section of tantalum tubing closed at the bottom. The container was then evacuated to below about $10^{-5}$ to $10^{-6}$ torr and a lid welded thereon.

The sealed container was disposed in an apparatus of the "girdle" type described above arranged for near isostatic high-pressure, high temperature compaction and to provide a vacuum of below about $10^{-5}$ torr about the container. The temperature was raised therein to the order of 200° C. and then the compaction pressure was raised to 65 kilobars. The container was thereafter heated to the temperatures set forth in the table for a period of one hour after which the container was cooled well below the diamond-to-graphite transition, i.e., approximately ambient temperature. Pressure on the container was slowly reduced to avoid an abrupt change in pressure which would tend to cause fracturing of the compact. On removal of the canned-compact from the compaction apparatus and end of the container was removed by abrasion. The compact was visually examined and tested with a Vickers Hardness tester with the results set forth in the table.

TABLE

| Particle size, micron | Promoter content, weight percent | Compaction temperature, °C. | Compaction pressure kilobars, kb. | Compaction time, hour | Vickers hardness, HV | Compact condition |
|---|---|---|---|---|---|---|
| 0-5 | | 1,900 | 65 | 1 | 8,400 | Tough well-sintered coherent homogeneous compact. |
| 0-5 | | 1,900 | 65 | 1 | 8,000 | Do. |
| 0-5 | 0.1% B | 1,900 | 65 | 1 | 7,500 | Do. |
| 0-5 | 0.5% B | 1,900 | 65 | 1 | 8,700 | Do. |
| 0-5 | 1.0% B | 1,800 | 65 | 1 | 8,700 | Do. |
| 0-5 | 10% B | 1,800 | 65 | 1 | 2,300 | Fair sintering appearance compact broke easily. |
| 5-12 | | 1,800 | 65 | 1 | 2,700 | Fair sintering sample fairly tough. |
| 0-5 | | 1,000 | 65 | 1 | | Poor quality compact however some portions fairly well sintered. |
| 0-5 | 1% Si | 1,900 | 65 | 1 | 7,500 | Tough well sintered coherent homogeneous compact. |
| 0-5 | 1% Si | 1,900 | 65 | 1 | 8,000 | Do. |
| 0-5 | 1% Be | 1,900 | 65 | 1 | 7,700 | Do. |

While there has been described in the foregoing what may be considered to be preferred embodiments of the invention, modifications may be made therein without departing from the teachings of the invention and it is intended to cover all such as fall within the scope of the appended claims.

We claim:
1. In a method for producing a dense coherent self-bonded particulate diamond compact, the steps comprising:

heating clean finely-divided diamond particles to a temperature in the approximate range of 300° C. to 1000° C. while under a vacuum pressure of below about $10^{-5}$ torr for a time period of at least about 0.5 hour until degassing ceases and a vacuum pressure of $10^{-7}$ torr is achieved to precondition the surfaces of said particles;

cooling and maintaining the preconditioned diamond particles in a clean dry inert gas atmosphere;

preparing an assemblage of said preconditioned diamond particles in a mold container, said assemblage including preconditioned diamond particles having a particle size in the range of substantially 0.5 micron to 10 microns in amounts of about at least 20 parts by weight and sufficient to fill the interstices between any larger size particles in the assemblage and with surfaces of said particles being in direct contact;

evacuating said mold container to a vacuum pressure below about $10^{-5}$ torr and sealing said evacuated mold container to preserve said vacuum pressure therein;

compressing the evacuated sealed mold container with the assemblage of said particles therein to a pressure above the graphite-to-diamond transition point; simultaneously heating said compressed assemblage of preconditioned diamond particles in said sealed mold container to a temperature above the graphite-to-diamond transition point and substantially in the diamond stable region so that sintering of diamond-to-diamond contact surfaces results and a direct diamond particle-to-diamond particle bond is produced between the particles of said assemblage; and cooling said assemblage in the sealed mold container to below the graphite-to-diamond transition range and then reducing the pressure on said assemblage below the graphite-to-diamond transition point.

2. A process as defined in claim 1 wherein said finely-divided diamond particles are preconditioned by heating to a temperature of 400° to 600° C. at said vacuum pressure below about $10^{-5}$ torr.

3. A process as defined in claim 2 wherein said diamond particles of the assemblage have a particle size in the range of about 0.5 to 5 microns and said diamond particles are preconditioned by heating to a temperature of about 500° C. at said vacuum pressure below about $10^{-5}$ torr.

4. A process as defined in claim 3 wherein said diamond particles of the assemblage have a particle size in the range of 0.5 to about 5 microns and wherein said assemblage of diamond particles is compressed to a pressure of at least about 35 kilobars and at a temperature above about 1300° C.

5. A process as defined in claim 4 wherein said assemblage of finely-divided diamond particles includes elemental material selected from the group consisting of boron, silicon and beryllium dust in admixture in amounts below about 3% by weight.

6. A process as defined in claim 4 wherein said clean finely-divided diamond particles are provided by washing successively with an organic solvent selected from the group consisting of acetone and chlorinated hydrocarbons and finally with a low molecular weight alcohol.

7. A process as defined in claim 3 wherein said assemblage of preconditioned diamond particles prepared in the mold container includes in intimate admixture therewith a material selected from the group consisting of elemental boron dust, silicon dust and beryllium dust in amounts below about 1% by weight, and said assemblage in the sealed mold container is compressed to a pressure in the range of about 55 to 80 kilobars, at a temperature in the range of about 1600° C. to about 2000° C.

References Cited
UNITED STATES PATENTS

| | | | |
|---|---|---|---|
| 3,293,012 | 12/1966 | Smiley et al. | 51—309 |
| 3,407,445 | 10/1968 | Strong | 51—307 |
| 2,947,609 | 8/1960 | Strong | 23—209.1 |
| 3,141,746 | 7/1964 | De Lai | 51—309 |
| 3,239,321 | 3/1966 | Blainey et al. | 51—309 |
| 3,306,720 | 2/1967 | Darrow | 51—309 |

DONALD J. ARNOLD, Primary Examiner

U.S. Cl. X.R.
51—309; 23—209.1